H. W. RAMBERG.
PISTON ROD PACKING.
APPLICATION FILED NOV. 8, 1912.

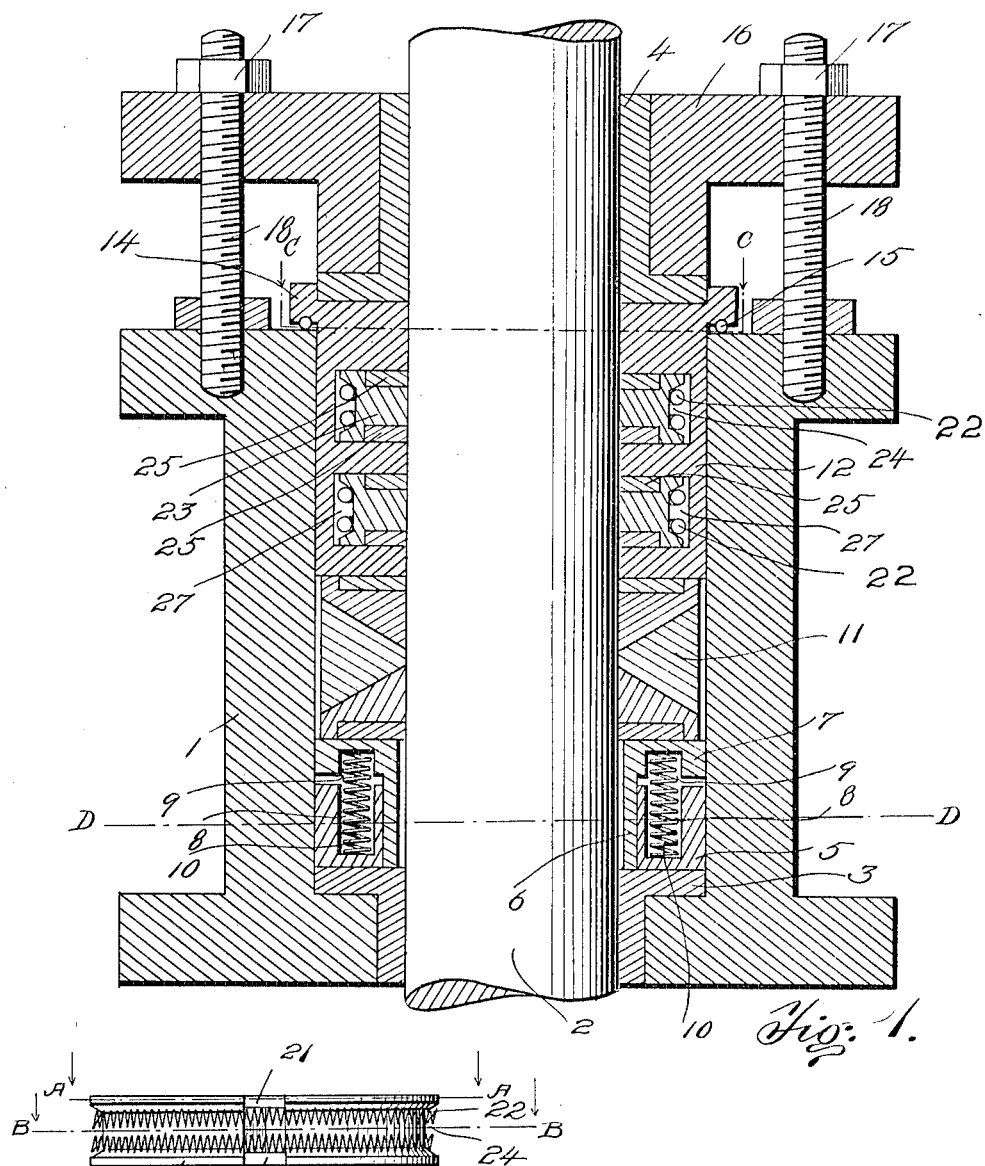

1,089,789.

Patented Mar. 10, 1914.
2 SHEETS—SHEET 2.

Witnesses
M. P. McKee
R. Kislick

Inventor
H. W. Ramberg
By Alex J. Wedderburn, Jr.
Attorney

UNITED STATES PATENT OFFICE.

HAKEN WILFRED RAMBERG, OF BROOKLYN, NEW YORK.

PISTON-ROD PACKING.

1,089,789.  Specification of Letters Patent.  Patented Mar. 10, 1914.

Application filed November 8, 1912. Serial No. 730,196.

*To all whom it may concern:*

Be it known that I, HAKEN W. RAMBERG, a citizen of the United States, residing at Brooklyn, in the county of Kings and State of New York, have invented certain new and useful Improvements in Piston-Rod Packings, of which the following is a specification.

This invention relates to improvements in piston-rod packing and has for its object to provide a simple, efficient, and inexpensive packing that will not become impaired in use from wear and that will form a fluid-tight connection with the piston rod.

With the above and other objects in view my invention consists in the combination, arrangement, and details of construction disclosed in the following description and drawings, and then more particularly pointed out in the appended claims.

Figure 3:
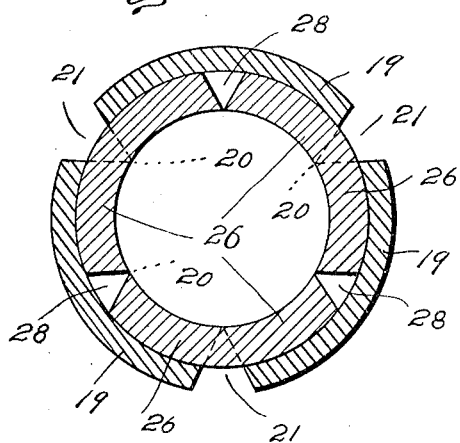
Figure 4:
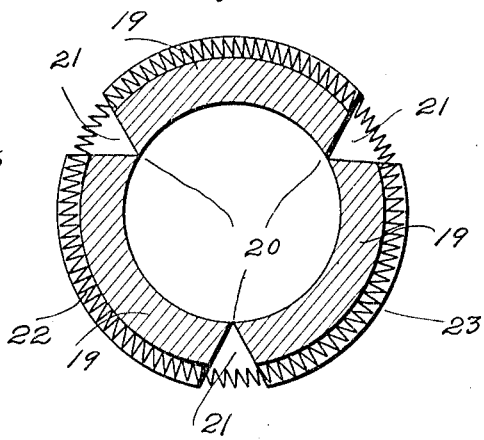
Figure 5:
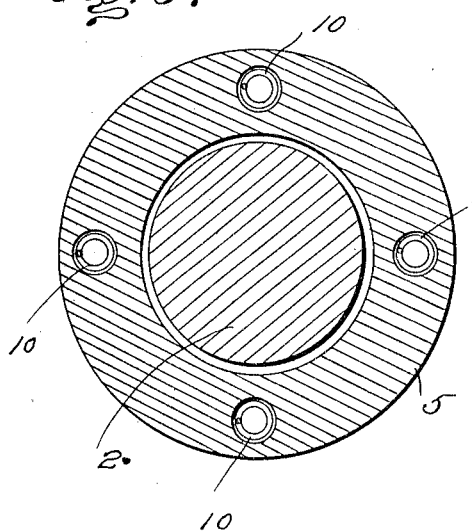
Figure 6:
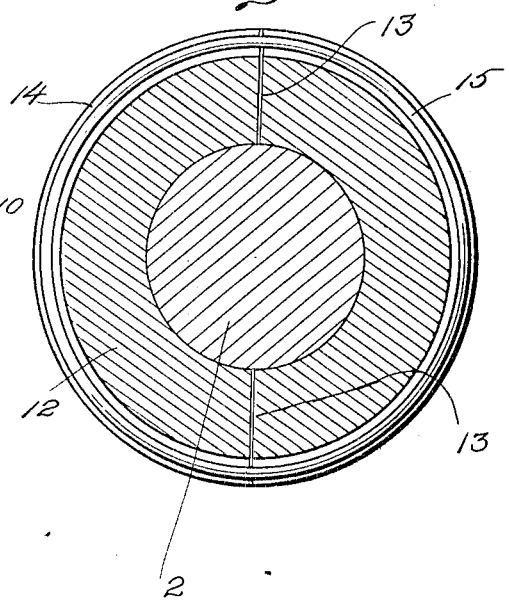

In the drawings, wherein similar reference characters designate similar parts throughout the respective views, Figure 1 is a sectional elevation of a stuffing box showing my improved packing in position therein, Fig. 2 is an end elevation of a part of the packing to be described, Fig. 3 is a transverse view, partly in section, of a packing ring taken on the line A—A of Fig. 2, Fig. 4 is a transverse view, partly in section, of said packing ring taken on the line B—B of Fig. 2, Fig. 5 is a transverse sectional view of another packing ring taken on line D—D of Fig. 1, and Fig. 6 is a transverse view, partly in section, of a packing member to be described, taken on the line C—C of Fig. 1.

Referring to the drawings which are merely illustrative of my invention 1 denotes a stuffing box, 2 the piston rod, and 3 and 4 are headed bushings, the former fitting the inner end of the stuffing box. Placed against the bushing 3 are two packing rings so arranged that ring 5 will fit over the reduced part 6 of ring 7. The rings 5 and 7 are formed with registerable recesses 8 and 9 respectively and compression springs 10 will project into said registerable recesses. Placed against the ring 7 are spacing packing rings of any approved construction which are designated at 11. Against the flat side of the packing 11 will be placed the packing member 12 which is split as at 13, forming two sections which are easily joined so as to surround the piston rod 2. The sectional packing member 12 is formed with a flange 14, at one end, and this flange is arranged, as shown in Fig. 1, to inclose the head of the bushing 4 as well as to bear against and to receive a hoop 15. The usual gland 16 bears against the bushing 4, being forced to exert a compressing action against the packing members in the stuffing box, when the nuts 17 are tightened, said nuts bearing against the gland 16 and engaging the usual screw bolts 18 of the stuffing box 1. The springs 10 hold rings 5 and 7 apart and to such an extent that the inner edge of the reduced part 6 of ring 7 will be spaced from the bushing 3. When nuts 17 are tightened the packing members 11 and 12 will be driven inwardly thereby making ring 7 compress the springs 10. Packing member 12 is of such a length that its flange 14 will be able to bind against the hoop 15 and force it to form a fluid-tight joint with the stuffing box only after said flange has moved inwardly a certain distance, but the flange will engage said hoop just before the reduced part 6 of ring 7 makes contact with the bushing 3. In this way the packing will be compressed by forces at work at the inner and outer ends of the stuffing box.

Another feature of my invention resides in causing inclosed packing rings to adjust themselves upon the piston rod when they become worn out, or when the piston rod is or becomes worn out. These packing rings, two being shown by way of illustration, are formed in sections, designated 19, the sections 19 being arcuate portions arranged to surround the piston rod before they are inclosed in the stuffing box. These arcuate portions touch at a tangent to the inner circumference 20 formed by their junctures whereby spaces 21 are left between said portions where they do not touch, the object being to lessen the rubbing friction between them, when the coil springs 22 surrounding the portions at their outer circumference and holding them against the piston rod, are caused to expand against them when they become worn out. Three arcuate portions 19 form a ring 23, which is formed with a peripheral groove 24 in which the springs 22 are held against displacement, and washer sections 26 are countersunk at the sides of said ring, in staggered relation relatively to the arcuate portions 19, of the sectional ring 23, which sections 26 are also arcuate portions. These arcuate portions 26 also bear against the piston rod 2, and touch each other in the manner above-explained in connection with the arcuate portions 19. Owing to this arrangement, when the sections of ring 23 and washers 25 wear out, they will not only be forced by means of springs 22, to tighten around the piston, but they will be forced against each other.

The two rings 23 having been set up in position, the sections of packing ring 12 will be closed against these rings so that the latter lie snugly in the chambers 27 formed in said rings respectively. The packing ring 12 will then be slid upon piston rod 2 into the stuffing box and held firmly therein by the counter forces represented by the springs 10 and screw-bolts 18 respectively. The recesses 28 formed in the arcuate portions 19 receive the arcuate portions 26 in sliding relation.

Numerous modifications may be resorted to in practice without departing in principle from the details of construction herein disclosed.

What I claim is:—

1. In combination a plurality of segments, said segments being arranged to contact only at their inner edges whereby a continuous cylindrical inner surface of a ring is formed, said segments being separated by substantially V-shaped grooves, said segments being formed with a plurality of coextensive under recesses at opposite sides, a plurality of relatively narrower segments arranged in said under recesses and in staggered relation with respect to said first-named segments, said narrower segments arranged to contact at their inner edges to form a continuous inner surface of a ring, and compression springs coiled around said first-named segments and fitting in the grooves thereof.

2. In a stuffing box, in combination, a shaft, a bushing arranged at the inner end of said shaft, a ring inclosing said shaft at its inner end, a terminal flange formed on said ring and fitting snugly in said stuffing box, a second ring snugly surrounding the greater portion of the unflanged end of said first ring, said second named ring being formed with a plurality of circumferentially-extending relatively elongated recesses, said flange being formed with a plurality of circumferentially-extending recesses arranged to aline with first-named recesses, contractile springs arranged to lie in said pairs of registering recesses and arranged to hold said flanged ring normally spaced from the inner wall of said stuffing box, and means for forcing said flange to compress said springs to cause said first-named ring to engage the inner end of the stuffing box.

In testimony whereof I affix my signature in presence of two witnesses.

HAKEN WILFRED RAMBERG.

Witnesses:
  M. MIKKELSEN,
  H. M. HILLMAN.

---

Copies of this patent may be obtained for five cents each, by addressing the "Commissioner of Patents, Washington, D. C."